(12) United States Patent
Odani et al.

(10) Patent No.: US 6,760,906 B1
(45) Date of Patent: Jul. 6, 2004

(54) METHOD AND SYSTEM FOR PROCESSING PROGRAM FOR PARALLEL PROCESSING PURPOSES, STORAGE MEDIUM HAVING STORED THEREON PROGRAM GETTING PROGRAM PROCESSING EXECUTED FOR PARALLEL PROCESSING PURPOSES, AND STORAGE MEDIUM HAVING STORED THEREON INSTRUCTION SET TO BE EXECUTED IN PARALLEL

(75) Inventors: Kensuke Odani, Osaka (JP); Taketo Heishi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/478,989

(22) Filed: Jan. 7, 2000

(30) Foreign Application Priority Data

Jan. 12, 1999 (JP) .......................................... 11-004843

(51) Int. Cl.[7] ................................................. G06F 9/45
(52) U.S. Cl. ........................ 717/149; 717/146; 717/152; 717/159
(58) Field of Search ......................... 717/149, 150–161, 717/146

(56) References Cited

U.S. PATENT DOCUMENTS 6,035,387 A * 3/2000 Hsu et al. .................... 712/210
6,081,880 A * 6/2000 Sollars ......................... 711/202

OTHER PUBLICATIONS

Chen, "Branch merging for effective exploitation of instruction-level parallelism ", IEEE, pp.: 37–40, 1992.*

Chen, "Branch merging for scheduling concurrent executions of branch operations", IEEE, pp.: 369–375, Nov. 1996.*

* cited by examiner

Primary Examiner—Tuan Dam
Assistant Examiner—Ted T. Vo
(74) Attorney, Agent, or Firm—McDermott Will & Emery

(57) ABSTRACT

A parallel data processing system is provided for increasing the program execution rate of a target machine. A parallelizer converts intermediate code, which has been generated by a compiler front end, into a parallelly executable form. An execution order determiner determines the order of the basic blocks to be executed. An expanded basic block parallelizer subdivides the intermediate code of the basic blocks into execution units, each of which is made up of parallelly executable instructions, following the order determined and on the basic block basis. When a particular one of the basic blocks is subdivided into execution units, an instruction belonging to the first execution unit of the next basic block, which has already been subdivided into execution units, is also used.

28 Claims, 12 Drawing Sheets

Fig. 1(a)
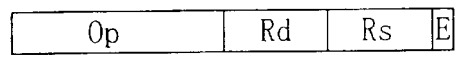
Fig. 1(b)
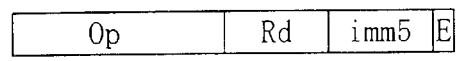
Fig. 1(c)
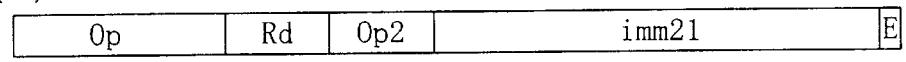
Fig. 1(d)
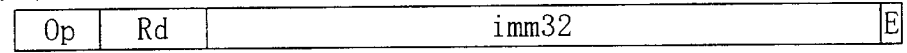
Fig. 1(e)
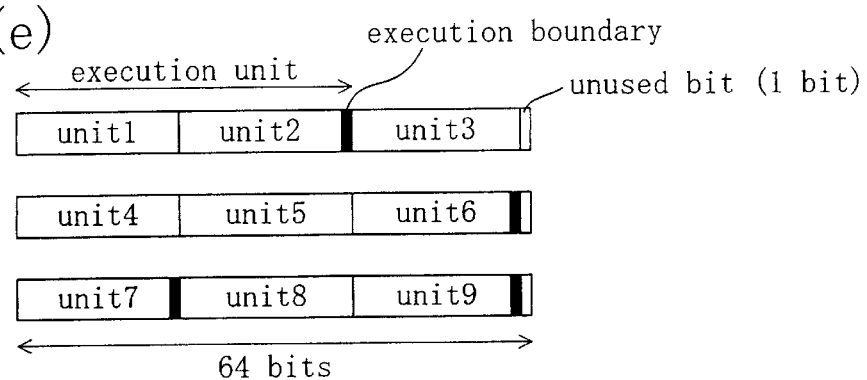
Fig. 1(f)
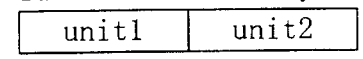
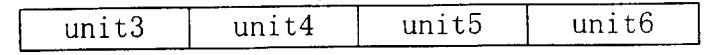
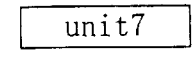

```
ld (mem1), R0
add 1, R0
st R0, (mem2)
mov R1, R0
mov R2, R3
add R3, R0
st R0, (mem3)
```

```
mov 2, r4
mov r4, r5
mov 0, r1
cmp c0, 0, r0
bt c0, Label
```
— basic block A

```
mov 1, r1
add r2, r1
```
— basic block B

○ mov 1, r1
↓
○ add r2, r1

| mov 1, r1 ■ | — execution boundary
| add r2, r1 ■ | — execution boundary

METHOD AND SYSTEM FOR PROCESSING PROGRAM FOR PARALLEL PROCESSING PURPOSES, STORAGE MEDIUM HAVING STORED THEREON PROGRAM GETTING PROGRAM PROCESSING EXECUTED FOR PARALLEL PROCESSING PURPOSES, AND STORAGE MEDIUM HAVING STORED THEREON INSTRUCTION SET TO BE EXECUTED IN PARALLEL

BACKGROUND OF THE INVENTION

The present invention generally relates to program processing technology applicable to a compiler for translating all the source code of a program written in a high-level language into object code, and more particularly relates to code optimization technology specially designed for a parallel processor.

As the performance and functions of various microprocessor application components have been increasingly enhanced these days, microprocessors with even higher performance are in higher and higher demand. To meet such a demand, parallel processors like very-long-instruction-word (VLIW) processors have been developed to realize still higher performance through parallel processing.

For example, a VLIW processor is supposed to process in parallel a combination of operations that are packed in each and every word of a program. The combination is made by a compiler, which extracts a number of parallelly executable instructions from a source program and then combines them into a single long instruction word, thereby shortening the time taken for the VLIW processor to execute the program.

According to the compilation technology, instructions are rearranged on a "basic block" basis, which means a set of instructions to be executed consecutively without any branch or halt. That is to say, a basic block is a collection of instructions controllable continuously from the first through last ones.

A VLIW processor, on the other hand, generally executes instructions included in a long, fixed-length word with a fixed parallelism index. Thus, the code conversion efficiency attainable by the VLIW processor is not always good. To eliminate such a problem, a VLIW processor for executing a variable number of instructions included in a variable-length word was developed recently. In the VLIW processor of this type, a set of instructions to be executed in parallel is divided into a plurality of groups on respective parallel execution boundaries, thereby making the number of instructions issued per cycle (i.e., index of parallelism) variable. In addition, the VLIW processor executes an instruction word of a variable length so as to improve the code conversion efficiency. In this specification, a group of instructions included between an adjacent pair of execution boundaries will be called an "execution unit (of instructions)". Furthermore, the VLIW processor can also execute a plurality of units of instructions concurrently while branching and recombining the processing flow.

As described above, the processor of this type rearranges the instructions on the basic block basis. Thus, if the compilation technology is applied to the processor of this type, even a set of instructions, which could be included in a single execution unit otherwise, might be unintentionally divided into several execution units on the basic block boundaries. As a result, the program execution rate attainable by such a processor cannot be regarded sufficiently high considering the potential performance of the VLIW processor.

SUMMARY OF THE INVENTION

An object of the present invention is increasing the program execution rate of a target machine in performing program processing for parallel processing purposes.

Specifically, an inventive program processing method for parallel processing includes the step of a) subdividing each of a plurality of basic blocks, into which program code has been divided, into a multiplicity of execution units. Each of the execution units is made up of parallelly-executable instructions. The method further includes the step of b) combining two of the execution units, which are located just before and after a basic block boundary, into a single execution unit if these execution units are executable within a single cycle.

According to the present invention, if a pair of execution units, which are located just before and after a basic block boundary, are found executable within a single cycle, then these execution units are combined into a single execution unit. Even a group of instructions ranging across a basic block boundary, or covering multiple basic blocks, are executable by a target machine within a single cycle if these instructions are classified as single execution unit. Accordingly, it is more probable that a group of instructions ranging across a basic block boundary are executable in parallel, thus cutting down the number of cycles to be done by the target machine to execute a program. As a result, the program execution rate increases.

In one embodiment of the present invention, the step b) preferably includes analyzing dependence between instructions belonging to the two execution units located just before and after the basic block boundary. And it is determined based on the analyzed dependence between the instructions whether or not these execution units located just before and after the basic block boundary are combinable into the single execution unit.

In another embodiment of the present invention, an execution boundary code indicating the identity as boundary between an associated pair of the execution units is preferably added to each said basic block boundary in the step a). In the step b), if the execution units located just before and after the basic block boundary are executable within the single cycle, then the execution boundary code that has been added to the basic block boundary is preferably removed.

In still another embodiment, instructions, which impose less strict constraints on resources of a target machine for executing the program, are selected preferentially in the step a) as respective instructions belonging to first and last execution units of each said basic block.

In this particular embodiment, when the instructions belonging to the first and last execution units of the basic block are selected in the step a), an instruction that is executable only by itself a cycle by the target machine is preferably given a lower priority.

In still another embodiment, when instructions belonging to first and last execution units of each said basic block are selected in the step a), an instruction with a short word length is preferably given a higher priority.

Another inventive program processing method for parallel processing includes the step of a) subdividing each of a plurality of basic blocks, into which program code has been divided, into a multiplicity of execution units. Each of the execution units is made up of parallelly-executable instructions. In the step a), a particular one of the basic blocks is preferably subdivided into a set of execution units along with an instruction belonging to one of the other execution units that is closest to the particular basic block. The closest execution unit belongs to another set of execution units, into which another one of the basic blocks that is adjacent to, and combinable with, the particular basic block has already been subdivided.

According to the present invention, a particular basic block is subdivided into a set of execution units along with an instruction belonging to one of the other execution units that is closest to the particular basic block. The closest execution unit belongs to another set of execution units, into which another basic block that is adjacent to, and combinable with, the particular basic block has already been subdivided. Thus, a number of instructions covering multiple basic blocks across a basic block boundary are more likely to be combined into a single execution unit. Even a group of instructions ranging across a basic block boundary are executable by a target machine within a single cycle if these instructions are classified as single execution unit. Accordingly, it is more probable that a group of instructions covering several basic blocks across a basic block boundary are executable in parallel, thus cutting down the number of cycles to be done by the target machine to execute a program. As a result, the program execution rate increases.

In one embodiment of the present invention, one of the basic blocks that is located just before the particular basic block may be used as the combinable basic block in the step a). The particular basic block, along with the instruction belonging to the last execution unit of the combinable basic block, may be subdivided into the set of execution units.

In an alternate embodiment, one of the basic blocks that is located just after the particular basic block may be used as the combinable basic block in the step a). The particular basic block, along with the instruction belonging to the first execution unit of the combinable basic block, may be subdivided into the set of execution units.

In still another embodiment, each said basic block may be subdivided in the step a) into the execution units sequentially in a forward direction from the beginning toward the end of the program.

In an alternate embodiment, each said basic block may be subdivided in the step a) into the execution units sequentially in a backward direction from the end toward the beginning of the program.

In still another embodiment, one of the basic blocks that belongs to the innermost loop is preferably subdivided into the execution units preferentially.

In yet another embodiment, the method may further include the step b) of subdividing each said basic block of the program code into another set of execution units independent of adjacent ones of the basic blocks. Results of the steps a) and b) are compared to each other and one of these steps a) and b) that results in the smaller number of execution units is adopted.

An inventive program processor for parallel processing includes an intra basic block parallelizer for subdividing each of a plurality of basic blocks, into which program code has been divided, into a multiplicity of execution units. Each of the execution units is made up of parallelly-executable instructions. The processor further includes a basic block boundary parallelizer for combining two of the execution units, which are located just before and after a basic block boundary, into a single execution unit if these execution units are executable within a single cycle.

Another inventive program processor is adapted to execute compilation for parallel processing purposes. The processor includes: a compiler front end for translating source code into intermediate code by dividing the source code into a plurality of basic blocks; a parallelizer for converting the intermediate code into code in a parallelly-executable form; and an object code generator for translating the intermediate code in the form converted by the parallelizer into object code executable by a target machine. The parallelizer includes: an intra basic block parallelizer for subdividing each of a plurality of basic blocks, into which the intermediate code has been divided, into a multiplicity of execution units, each being made up of parallelly-executable instructions; and a basic block boundary parallelizer for combining two of the execution units, which are located just before and after a basic block boundary, into a single execution unit if these execution units are executable within a single cycle.

Still another inventive program processor for parallel processing includes an expanded basic block parallelizer for subdividing each of a plurality of basic blocks, into which program code has been divided, into a multiplicity of execution units, each being made up of parallelly-executable instructions. The expanded basic block parallelizer subdivides a particular one of the basic blocks into a set of execution units along with an instruction belonging to one of the other execution units that is closest to the particular basic block. The closest execution unit belongs to another set of execution units, into which another one of the basic blocks that is adjacent to, and combinable with, the particular basic block has already been subdivided.

Yet another inventive program processor is also adapted to execute compilation for the parallel processing purposes. The processor includes: a compiler front end for translating source code into intermediate code by dividing the source code into a plurality of basic blocks; a parallelizer for converting the intermediate code into code in a parallelly-executable form; and an object code generator for translating the intermediate code in the form converted by the parallelizer into object code executable by a target machine. The parallelizer includes an expanded basic block parallelizer for subdividing each of a plurality of basic blocks, into which the intermediate code has been divided, into a multiplicity of execution units, each being made up of parallelly-executable instructions. The expanded basic block parallelizer subdivides a particular one of the basic blocks into a set of execution units along with an instruction belonging to one of the other execution units that is closest to the particular basic block. The closest execution unit belongs to another set of execution units, into which another one of the basic blocks that is adjacent to, and combinable with, the particular basic block has already been subdivided.

An inventive storage medium has stored thereon a program getting a program processing procedure executed by a computer for parallel processing purposes. The program processing procedure includes the steps of: a) subdividing each of a plurality of basic blocks, into which program code has been divided, into a multiplicity of execution units, each being made up of parallelly-executable instructions; and b) combining two of the execution units, which are located just before and after a basic block boundary, into a single execution unit if these execution units are executable within a single cycle.

Another inventive storage medium has stored thereon a program getting a program processing procedure executed by a computer through compilation for parallel processing purposes. The program processing procedure includes the steps of: a) translating source code into intermediate code by dividing the source code into a plurality of basic blocks; b) subdividing each said basic block of the intermediate code into a multiplicity of execution units, each being made up of parallelly-executable instructions; c) combining two of the execution units, which are located just before and after a basic block boundary, into a single execution unit if these execution units are executable within a single cycle; and d) translating the intermediate code in the form converted in the steps b) and c) into object code executable by a target machine.

Still another inventive storage medium has stored thereon a program getting a program processing procedure executed by a computer for parallel processing purposes. The program processing procedure includes the step of subdividing each of a plurality of basic blocks, into which program code has been divided, into a multiplicity of execution units, each being made up of parallelly-executable instructions. A particular one of the basic blocks is subdivided into a set of execution units along with an instruction belonging to one of the other execution units that is closest to the particular basic block. The closest execution unit belongs to another set of execution units, into which another one of the basic blocks that is adjacent to, and combinable with, the particular basic block has already been subdivided.

Yet another inventive storage medium has stored thereon a program getting a program processing procedure executed by a computer through compilation for parallel processing purposes. The program processing procedure includes the steps of a) translating source code into intermediate code by dividing the source code into a plurality of basic blocks; b) subdividing each said basic block of the intermediate code into a multiplicity of execution units, each being made up of parallelly-executable instructions; and c) translating the intermediate code in the form processed in the step b) into object code executable by a target machine. In the step b), a particular one of the basic blocks is subdivided into a set of execution units along with an instruction belonging to one of the other execution units that is closest to the particular basic block. The closest execution unit belongs to another set of execution units, into which another one of the basic blocks that is adjacent to, and combinable with, the particular basic block has already been subdivided.

Yet another inventive storage medium has stored thereon a set of instructions to be executed in parallel. The instruction set is grouped into a plurality of execution units, each being made up of parallelly-executable instructions, and at least one of the execution units is located across a boundary between an associated pair of the basic blocks.

BRIEF DESCRIPTION OF THE DRAWINGS

FIGS. 1(a) through 1(d) illustrate an exemplary instruction set to be executed by a target machine in program processing according to the present invention;

FIG. 1(e) illustrates exemplary executable code processed by the target machine; and FIG. 1(f) schematically illustrates how the target machine executes the instructions.

DESCRIPTION OF THE PREFERRED EMBODIMENTS

Figure 2:
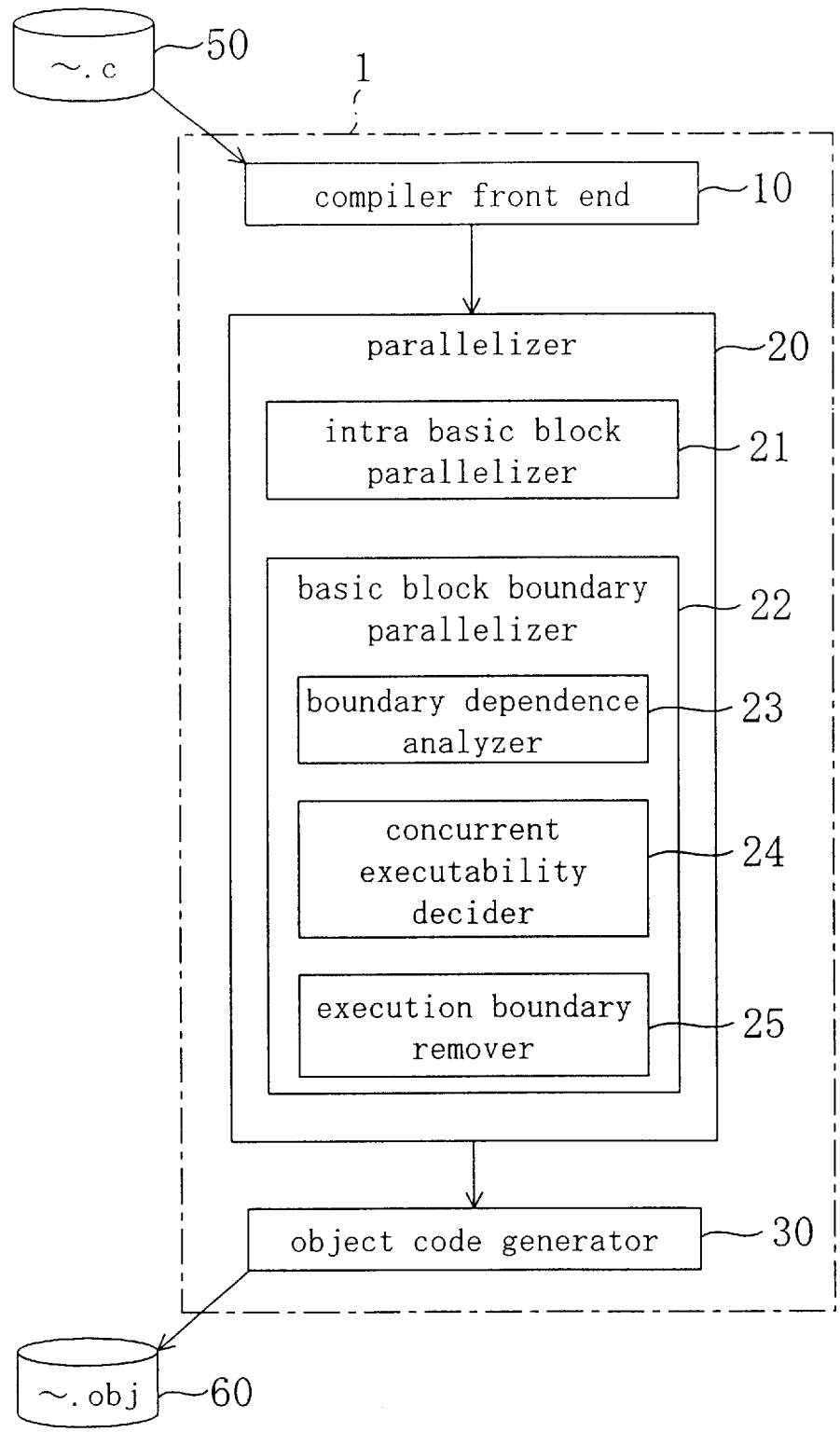
FIG. 2 is a block diagram illustrating a configuration for a program processor according to a first embodiment of the present invention.

Hereinafter, preferred embodiments of the present invention will be described with reference to the accompanying drawings.

Target Machine

First, a target machine applicable to program processing according to the present invention will be described.

According to the present invention, a processor that can execute a variable number of variable-length instructions per cycle and has an index of parallelism of three is used as the target machine. An instruction set executed by this target machine is made up of a plurality of instruction units, each being composed of 21 bits. The format of a single instruction set includes: a 21-bit instruction (short instruction) consisting of just one unit; and a 42-bit instruction (long instruction) consisting of two units. That is to say, this target machine is compatible with a variable-length instruction system.

Each instruction is provided with information indicating whether or not the instruction is adjacent to a boundary between execution units, i.e., execution boundary. If the information indicates that the instruction is adjacent to the execution boundary, then the instruction in question and the next instruction are not executed within the same cycle. Instead, the target machine executes instructions located between a pair of execution boundaries, i.e., instructions belonging to the same execution unit, within the same cycle.

Following is the constraints imposed on instructions that can be included within a single execution unit:

1) The number of instructions included in a single execution unit should be no greater than three: and
2) The total resources of the target machine that can be allocated to instructions in a single execution unit are not more than 3 arithmetic logic (ALU) units, 1 multiplication unit, 1 LD/ST unit and 1 branch unit.

This constraint is called "resource constraint".

Only when both of these two conditions are met, the instructions can be executed in parallel.

Since the number of instructions belonging to a single execution unit may be arbitrarily defined so long as the constraint (1) is met, a variable number of instructions can be issued per cycle. To reduce the load on the hardware, the target machine does not determine whether or not the instructions included in a single execution unit are parallelly executable semantically or in such a manner as to meet the resource constraint imposed by the target machine. That is to say, it must be ensured for the target machine at the program processing end that parallelly executable instructions are appropriately arranged between a pair of execution boundaries.

Also, the target machine does not always execute all the instructions included in a single execution unit concurrently. For example, if one of the instructions in a single execution unit arrived later than its expected time, then the instructions in the execution unit might be executed by the target machine separately at different times. Thus, when the program processing is performed, the instructions in an execution unit should be arranged in such an order that the semantic operation of the program is correct even if the instructions are executed at several different times.

As can be seen from the above conditions, a branch instruction may be included in an execution unit. For example, an execution unit may include "conditional branch instruction", "ALU instruction" and "LD instruction" in this order. In this case, if the first instruction "conditional branch" is executed while meeting the above conditions, then the instructions "ALU" and "LD", which succeed the branch instruction in the same execution unit, are not executed. Similarly, an interrupt into a middle of an execution unit is also permitted. In such a case, the instructions, which precede the jump destination instruction in the execution unit, are not executed.

FIGS. 1(a) through 1(d) illustrate an exemplary instruction set to be executed by a target machine. In FIGS. 1(a) through 1(d), opcode Op, Op2, destination register Rd, source register Rs and n-bit constant immn (where n is a constant) are included in this instruction set. Each instruction is further provided with a bit E indicating the presence or absence of the execution boundary. If an instruction is located adjacent to an execution unit boundary, then the bit E is one. Specifically, the instruction shown in FIG. 1(a) is a register-to-register operation instruction, while the instructions shown in FIGS. 1(b), 1(c) and 1(d) are operation instructions using less than 5 bit constant, less than 21 bit constant and less than 32 bit constant, respectively. The instructions shown in FIGS. 1(a) and 1(b) are short instructions each composed of 21 bits, while the instructions shown in FIGS. 1(c) and 1(d) are long instructions each composed of 42 bits. The operation instruction using the less than 32 bit constant is nothing but an instruction of transferring a 32-bit constant to a register. This is because the number of remaining bits assignable to the opcode Op is small in the instruction including the 32-bit constant and the number of instructions using the 32-bit constant is limited.

Hereinafter, the actual operation of the target machine will be briefly described.

FIG. 1(e) illustrates exemplary executable code (object code) handled by the target machine. Each executable code is fetched by the target machine on a 64 bit basis (or as a packet) consisting of three 21-bit units. The actual total length of the three units is 63 bits (=21×3) and there is one extra bit left, which is not used for any special purpose. The instructions fetched by the target machine are executed on the execution unit basis, i.e., a set of instructions located between one execution boundary and the next. If there are any instructions that were fetched but not executed, then those instructions are stored in an instruction buffer and then executed in the next execution cycle or later.

FIG. 1(f) schematically illustrates how the target machine executes the instructions. In FIG. 1(f), each row corresponds to a set of instructions executed by the target machine per execution cycle.

Jump and interrupt out of, or into, a middle of an execution unit will be briefly described. Suppose Unit 1 is a conditional branch instruction and the conditions of the conditional branch are met in FIG. 1(e). In such a situation, although the conditional branch instruction of Unit 1 is executed, the instructions succeeding Unit 1 in the same execution unit, i.e., those of Units 2 and 3, are not executed. Also, if interrupt into Unit 5 occurs in FIG. 1(e), then the instructions preceding Unit 5 in the same execution unit, i.e., those of Units 3 and 4, are not executed.

In the following description, this processor is supposed to be used according to the present invention for convenience sake. However, inventive program processing is not limited to the basic instruction word length of 21 bits, parallelism index of 3 and resource constraints of 3 ALU units, 1 multiplication unit, 1 LD/ST unit and 1 branch unit as exemplified for the processor or to the above combination of executable instructions. The present invention is naturally applicable to other situations where these specifics are different.

Also, in the foregoing description, the information indicating the identity as execution boundary is attached to an instruction itself. Alternatively, the information representing the execution boundary may be stored in a different field separately from the instruction.

Embodiment 1

FIG. 2 is a block diagram illustrating a configuration for a program processor 1 according to a first exemplary embodiment of the present invention. As shown in FIG. 2, the program processor 1 includes a compiler front end 10, a parallelizer and an object code generator 30.

The compiler front end 10 retrieves source code 50, which is written in a high-level language like C and saved in a file format, and analyzes the syntax and semantics thereof to generate internal form code (i.e., intermediate code, or assembler code). Then, the compiler 10 divides the internal form code into a plurality of basic blocks, each of which is an instruction set without any branch or interrupt. If necessary, the compiler 10 optimizes the internal form code so as to reduce the size or execution time of the executable code (object code) to be generated ultimately.

The parallelizer 20 reads the internal form code generated by the compiler front end 10 as program code and then parallelizes the code for the target machine. The parallelizer includes an intra basic block parallelizer 21 and a basic block boundary parallelizer 22.

The intra basic block parallelizer 21 analyzes dependence among the instructions included in each basic block, schedules (or rearranges) the instructions and adds an execution boundary to the basic block, thereby parallelizing the internal form code. The intra basic block parallelizer 21 operates in the same way as the counterpart (i.e., a local parallelizer) in a known program processor (as we disclosed in Japanese Patent Application No. 10-095647).

The basic block boundary parallelizer 22 examines each basic block boundary of the internal form code that has been parallelized by the intra basic block parallelizer 21 and removes the execution boundary located at the basic block boundary if permitted. The basic block boundary parallelizer 22 includes a boundary dependence analyzer 23, a concurrent executability decider 24 and an execution boundary remover 25.

The boundary dependence analyzer 23 analyzes the dependence among all the instructions included in a pair of execution units, which are located just before and after a basic block boundary in question, thereby drawing up a dependence graph. In the following description, those instructions to be analyzed will be called "instructions in question". In a dependence graph, instructions are represented as nodes and dependence among them is represented as edge (or arrow). For example, suppose Instruction (a) must be executed to execute Instruction (b). Since Instruction (b) depends on Instruction (a) in such a case, the dependence therebetween is represented by a description "a→b". In the illustrated embodiment, the dependence is supposed to be "definition-reference" dependence (or data dependence), which represents dependence between an instruction defining a resource and another instruction referring to the same resource. A method of drawing up a dependence graph was disclosed by R. J. Blainey in an article entitled "Instruction scheduling in the TOBEY compiler" (IBMJ. RES. DEVELOP. Vol.38, No. 5, September 1994), for example.

Based on the dependence graph drawn up by the boundary dependence analyzer 23, the concurrent executability decider 24 decides whether or not all the instructions in question are executable within the same cycle.

Figure 3:
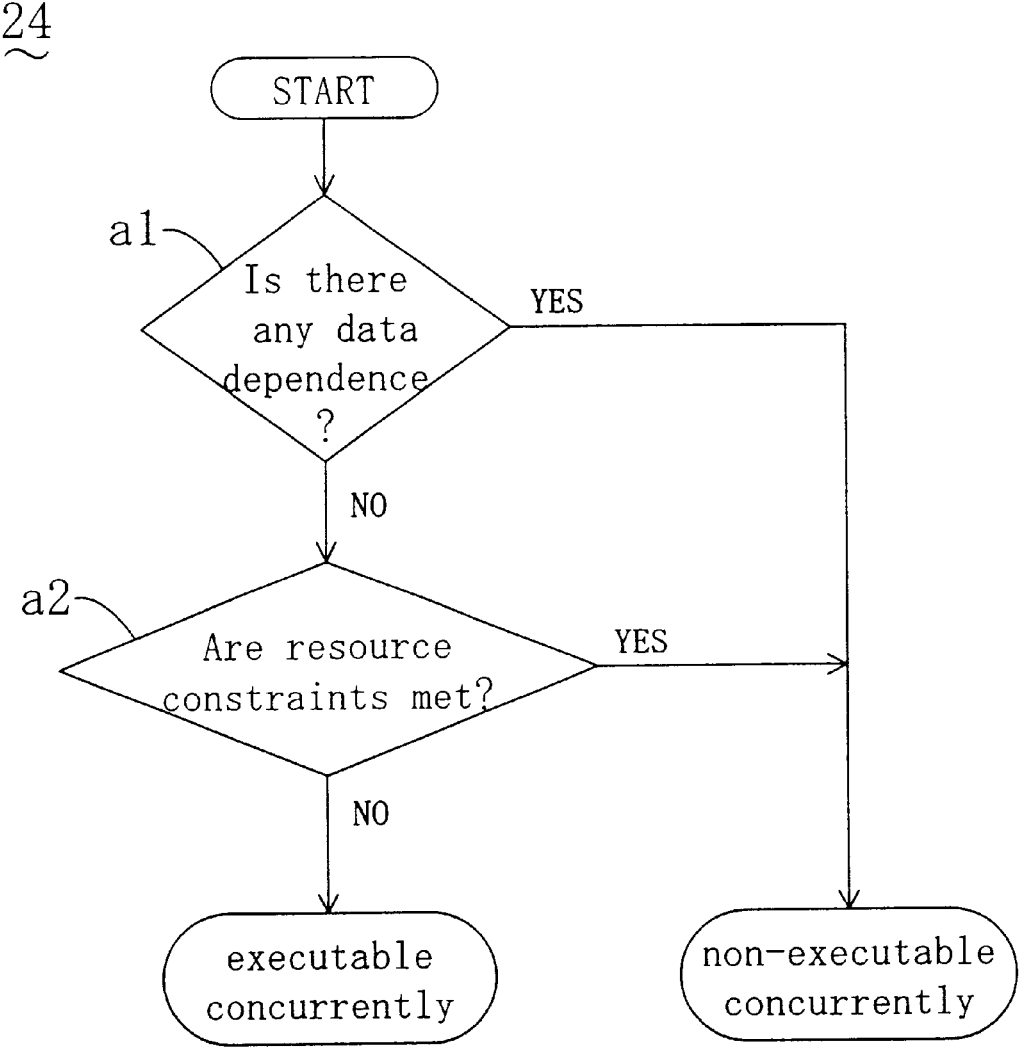
FIG. 3 is a flowchart illustrating a processing procedure in the concurrent executability decider included in the program processor shown in FIG. 2.

FIG. 3 is a flowchart illustrating a processing procedure in the concurrent executability decider 24. First, in Step a1, the decider 24 decides whether or not there is any data dependence among the instructions in question. If the answer is YES, then the decider 24 decides that those instructions are "non-executable concurrently" within the same cycle. Alternatively, if the answer is NO, then the decider 24 decides in Step a2 whether or not the resource constraint imposed by the target machine is met when all the instructions in question are executed within the same cycle. If the answer is NO, then the decider 24 decides that those instructions are "non-executable concurrently" within the same cycle. That is to say, only when the answers to the queries in Steps a1 and a2 are NO and YES, respectively, i.e., if there is no data dependence among the instructions in question and if the resource constraint imposed by the target machine is met, the decider 24 decides that those instructions are "executable concurrently" within the same cycle.

If the concurrent executability decider 24 has decided that the instructions in question are executable within the same cycle, then the execution boundary remover 25 removes the execution boundary located at the basic block boundary in question.

The object code generator 30 translates the internal form code (assembler code), which has been output from the parallelizer 20, into object code 60 and outputs the object code 60 as a file.

Hereinafter, characteristic operations of the program processor shown in FIG. 2 will be described by way of operating examples using specific instructions.

Operating Example 1

Figure 4:
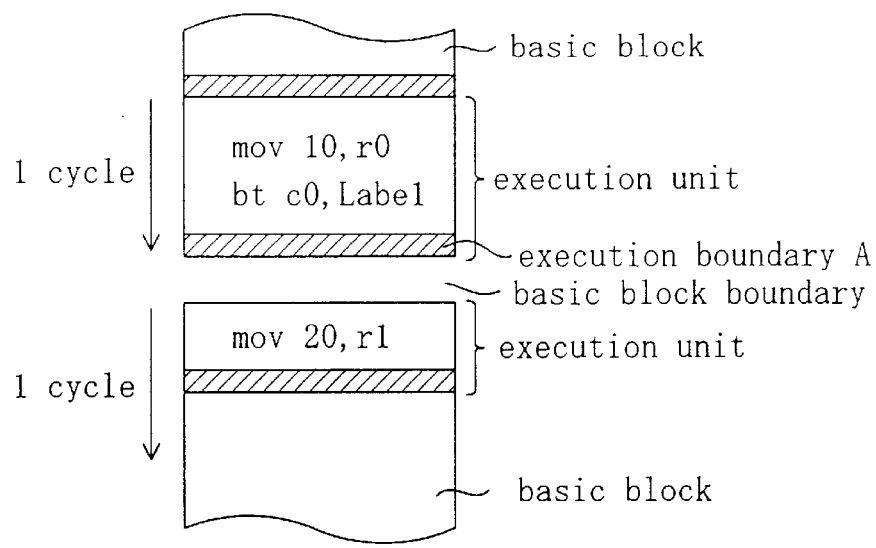
FIG. 4 illustrates exemplary internal form code received by the basic block boundary parallelizer included in the program processor shown in FIG. 2.

FIG. 4 illustrates exemplary internal form code that has been processed by the intra basic block parallelizer 21 included in the parallelizer 20. As described above, the compiler front end 10 translates the source program 50 into the internal form code, which is made up of a plurality of basic blocks divided. Then, the intra basic block parallelizer 21 subdivides each of the basic blocks into execution units, each of which is made of parallelly-executable instructions. As a result, the internal form code such as that shown in FIG. 4 is generated by the intra basic block parallelizer 21.

The basic block boundary parallelizer 22 receives the internal form code such as that shown in FIG. 4. In FIG. 4, only a pair of execution units that are located just before and after a basic block boundary in question are illustrated. The execution boundary A is provided due to the existence of the basic block boundary and has nothing to do with the parallelism of the instructions. Thus, an execution boundary code indicating the execution boundary A is added thereto.

Figure 5:
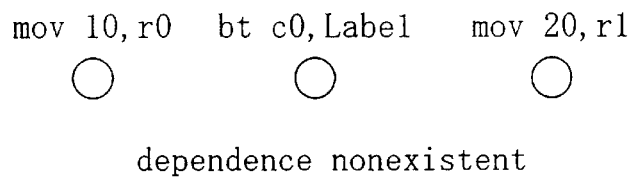
FIG. 5 is a dependence graph for the internal form code shown in FIG. 4.

First, the boundary dependence analyzer 23 is activated to draw up a dependence graph shown in FIG. 5 from the internal form code shown in FIG. 4. As shown in FIG. 5, there is no dependence among the three instructions in question.

Next, the concurrent executability decider 24 is activated. In the illustrated example, there is no data dependence among the three instructions in question shown in FIG. 4 (i.e., the answer to the query in Step a1 is NO). And the resource constraint imposed by the target machine is met (i.e., the answer to the query in Step a2 is YES). Thus, the decider 24 decides that these instructions are "executable concurrently".

Subsequently, the execution boundary remover 25 is activated. Since the concurrent executability decider 24 has affirmed the concurrent executability of the instructions in question, the remover 25 removes the execution boundary code representing the execution boundary A that is located at the basic block boundary in question.

Figure 6:
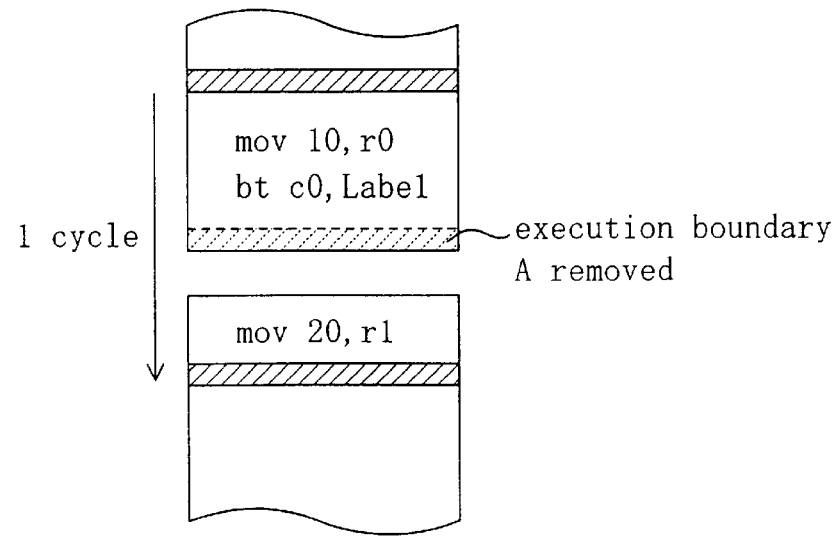
FIG. 6 illustrates, in an assembly language, object code that has been generated for the internal form code shown in FIG. 4.

As a result, the object code generator 30 outputs portion of the object code 60, corresponding to the internal form code shown in FIG. 4, as the code shown in FIG. 6. The object code is described in an assembly language in FIG. 6 to make the code easily understandable (the same statement will be applied to FIGS. 9 and 19, too). As can be seen from FIG. 6, now that the execution boundary A has been removed, the three instructions in question are executed within the same cycle, thus shortening the time taken for the target machine to execute the program.

Operating Example 2

Figure 7:
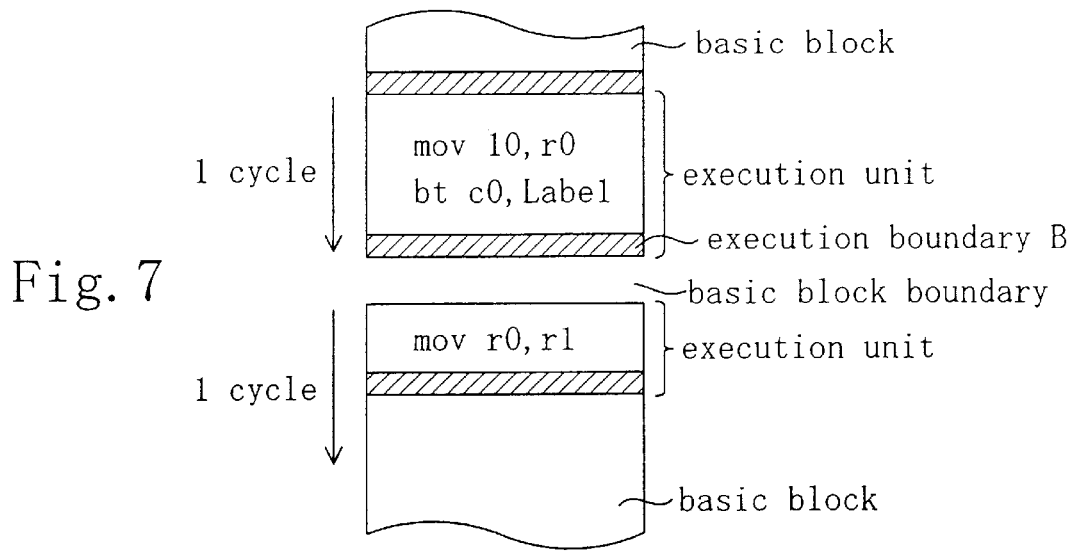
FIG. 7 illustrates another exemplary internal form code received by the basic block boundary parallelizer included in the program processor shown in FIG. 2.

FIG. 7 illustrates another exemplary internal form code processed by the intra basic block parallelizer 21 included in the parallelizer 20. As in FIG. 4, only a pair of execution units located just before and after a basic block boundary in question are illustrated in FIG. 7. Just like the execution boundary A shown in FIG. 4, the execution boundary B is also provided due to the existence of the basic block boundary and has nothing to do with the parallelism of the instructions.

Figure 8:
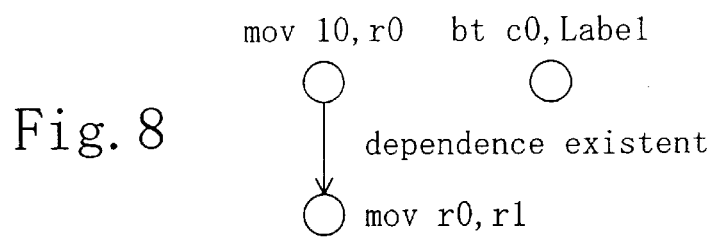
FIG. 8 is a dependence graph for the internal form code shown in FIG. 7.

First, the boundary dependence analyzer 23 is activated to draw up a dependence graph shown in FIG. 8 from the internal form code shown in FIG. 7. As shown in FIG. 8, there is data dependence between instructions "mov 10, r0" and "mov r0, r1", i.e., the instruction "mov r0, r1" depends on the instruction "mov 10, r0".

Next, the concurrent executability decider 24 is activated. In the illustrated example, there is data dependence among the three instructions in question shown in FIG. 7 (i.e., the answer to the query in Step a1 is YES). Thus, the decider 24 decides that these instructions are "non-executable concurrently".

Subsequently, the execution boundary remover 25 is activated. Since the concurrent executability decider 24 has negated the concurrent executability of the instructions in question, the remover 25 does not remove the execution boundary B located at the basic block boundary in question. As a result, the execution boundary B remains as it is.

Figure 9:
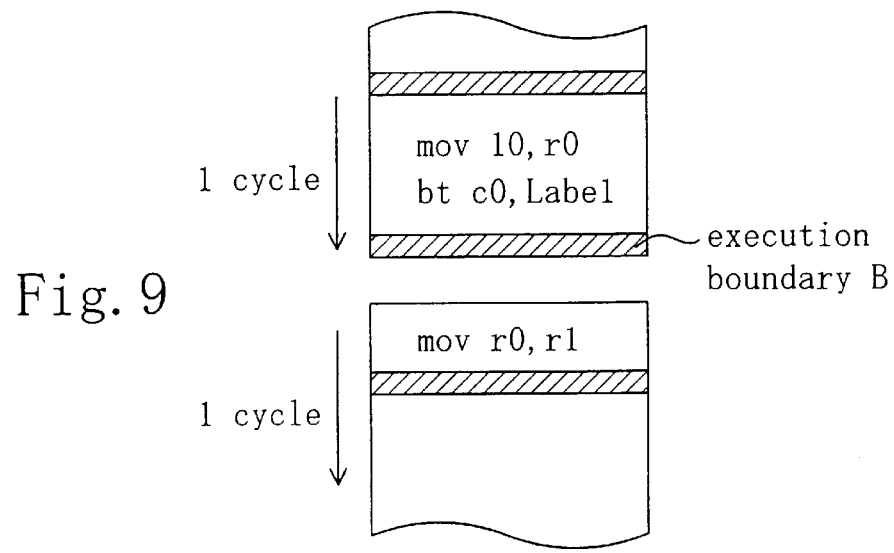
FIG. 9 illustrates, in an assembly language, object code that has been generated for the internal form code shown in FIG. 7.

FIG. 9 illustrates portion of the object code 60 that has been generated by the object code generator 30 from the internal form code shown in FIG. 7. As can be seen from FIG. 9, since the execution boundary B remains, the three instructions in question are executed in two cycles.

According to this embodiment, each of a plurality of basic blocks, into which intermediate code has been divided, is subdivided into a multiplicity of execution units, each of which is made up of parallelly-executable instructions. And if two of the execution units, which are located just before and after a basic block boundary, are found executable within the same cycle, then these execution units are combined into a single execution unit. Thus, the number of cycles taken for the target machine to execute the program can be reduced and the program execution rate can be increased.

In making the intra basic block parallelizer 21 shown in FIG. 2 subdivide each basic block into execution units, instructions, on which less strict resource constraints are imposed by the target machine, may be selected preferentially. More specifically, in selecting instructions belonging to the first and last execution units of a basic block, instructions on which strict resource constraints are imposed, e.g., load, store and multiply instructions, each of which can be executed only by itself a cycle, should preferably be avoided by giving lower priorities thereto. In such a case, instructions with less strict resource constraints are allocated to the execution units located just before and after a basic block boundary. As a result, the basic block boundary parallelizer 22 is more likely to combine a pair of execution units located just before and after a basic block boundary.

Also, in making the intra basic block parallelizer 21 shown in FIG. 2 subdivide each basic block into execution units, instructions with short word lengths may be selected preferentially. More specifically, long instructions requiring two units, e.g., instructions using immediate values of more than 5 bits,.should preferably be avoided by giving lower priorities thereto. In such a case, instructions with relatively short word lengths are allocated to the execution units located just before and after a basic block boundary. Thus, even in a target machine that can fetch and execute instructions with a limited word length at a time, the basic block boundary parallelizer 22 is more likely to combine a pair of execution units that are located just before and after a basic block boundary. Furthermore, a branched instruction might be inserted into an execution unit located just after a basic block boundary and therefore that execution unit might be short of the required word length in a variable length instruction system. However, if the instructions with short word lengths are selected preferentially, then such a situation can be avoided because the instruction word length of each execution unit is shorter.

Embodiment 2

Figure 10:
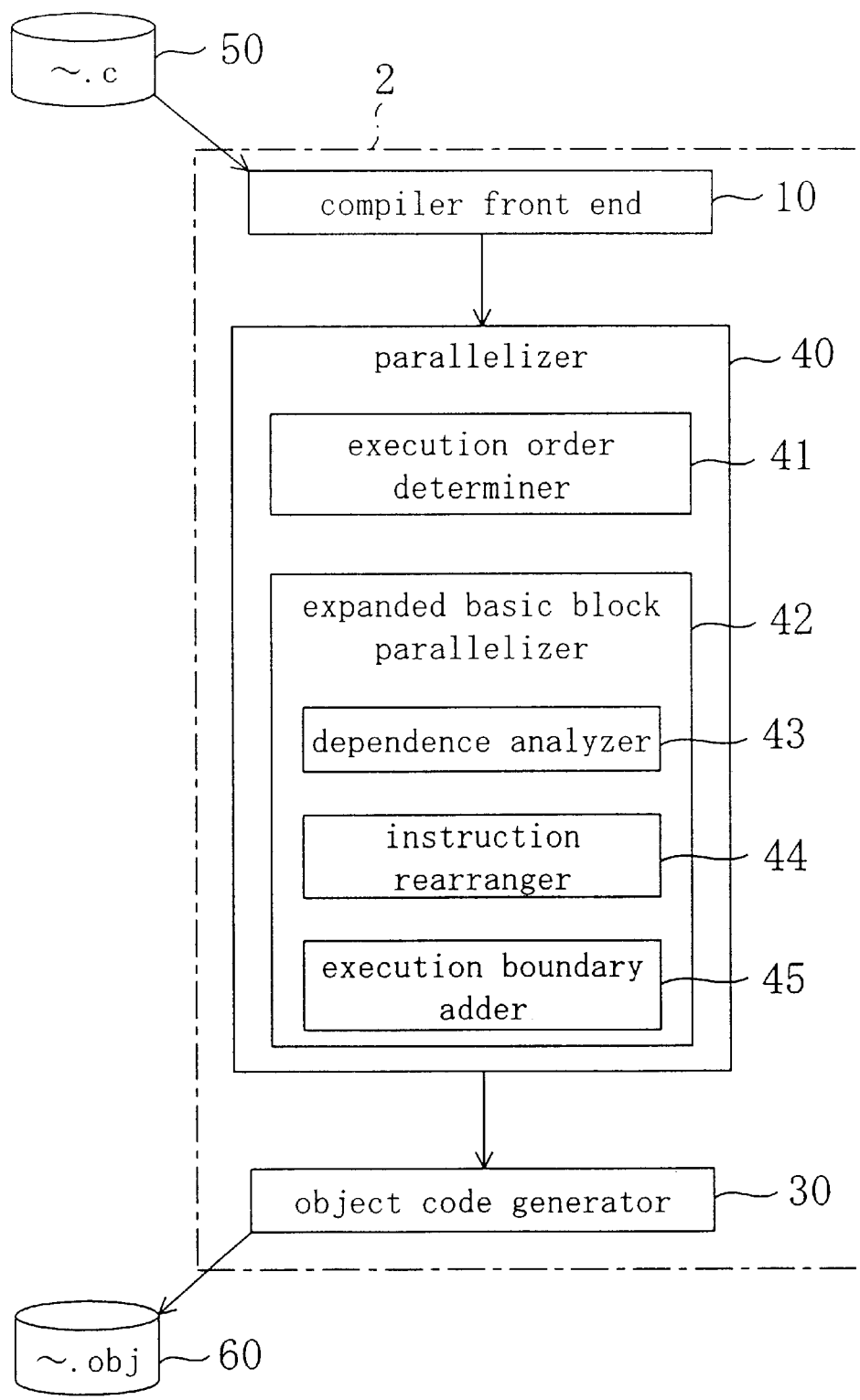
FIG. 10 is a block diagram illustrating a configuration for a program processor according to a second embodiment of the present invention.

FIG. 10 is a block diagram illustrating a configuration for a program processor 2 according to a second exemplary embodiment of the present invention. As shown in FIG. 10, the program processor 2 includes a compiler front end 10, a parallelizer 40 and an object code generator 30.

Like the compiler front end 10 shown in FIG. 2, the compiler front end 10 shown in FIG. 10 also retrieves source code 50 to generate internal form code (assembler code) that has been divided into basic blocks. Also, the object code generator 30 translates the internal form code, which has been output from the parallelizer 40, into object code 60 and then outputs the object code 60 as a file in the same way as the counterpart 30 shown in FIG. 2.

The parallelizer 40 reads the internal form code generated by the compiler front end 10 as program code and parallelizes the code for the target machine. The parallelizer 40 includes an execution order determiner 41 and an expanded basic block parallelizer 42.

The execution order determiner 41 determines the order of basic blocks in the internal form code read out that are to be passed to the expanded basic block parallelizer 42. In the illustrated embodiment, the basic blocks are passed to the expanded basic block parallelizer 42 in the ascending order, i.e., beginning with the last basic block of the program.

The expanded basic block parallelizer 42 analyzes dependence among the instructions included in each basic block, schedules the instructions and adds a parallel execution boundary to the basic block, thereby subdividing the basic block into a plurality of execution units, each being made up of parallelly executable instructions. The expanded basic block parallelizer 42 subdivides a particular basic block into execution units along with an instruction belonging to the first one of execution units, into which another basic block has already been subdivided. The latter basic block is located just after, and combinable with, the particular basic block. That is to say, unlike the intra basic block parallelizer 21 shown in FIG. 2, the expanded basic block parallelizer 42 rearranges the instructions of the basic block in question while taking the first execution unit of the next basic block into account.

The expanded basic block parallelizer 42 includes a dependence analyzer 43, an instruction rearranger 44 and an execution boundary adder 45. The dependence analyzer 43 analyzes dependence among the instructions included in the basic block in question and the instructions included in the first execution unit of the next basic block. In the illustrated embodiment, the dependence of the following four types is analyzed.

Data Dependence:
  Dependence of an instruction referring to a resource on another instruction defining the same resource;
Inverse Dependence:
  Dependence of an instruction defining a resource on another instruction referring to the same resource;

Output Dependence:
   Dependence between an instruction defining a resource and another instruction defining the same resource; and
Control Dependence
   Dependence of an instruction of the type changing a control flow, e.g., branch or return, which is located at the end of a basic block and should be executed after all the instructions belonging to the same basic block have been executed or within the same cycle.

If the original order of the instructions is changed, then the meaning of the program will be altered, no matter which dependence those instructions are defined by. Thus, in rearranging the instructions, the original dependence should be maintained.

Figures 11, 12:
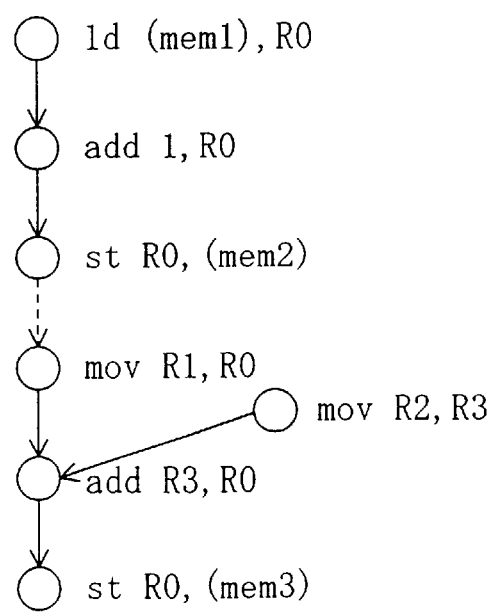
FIG. 11 illustrates exemplary assembler code.
FIG. 12 is a dependence graph for the assembler code shown in FIG. 11.

The dependence analyzer 43 draws up a dependence graph representing dependence among the instructions for each basic block. FIG. 11 illustrates exemplary assembler code, while FIG. 12 is a dependence graph for the assembler code shown in FIG. 11. In FIG. 12, each solid line represents data dependence, while the broken line represents inverse dependence. Also, mem1, mem2 and mem3 refer to mutually different memory addresses.

The instruction rearranger 44 rearranges the instructions in the basic block using the dependence graph drawn up by the dependence analyzer 43, thereby generating parallelized assembler code for the target machine.

Figure 13:
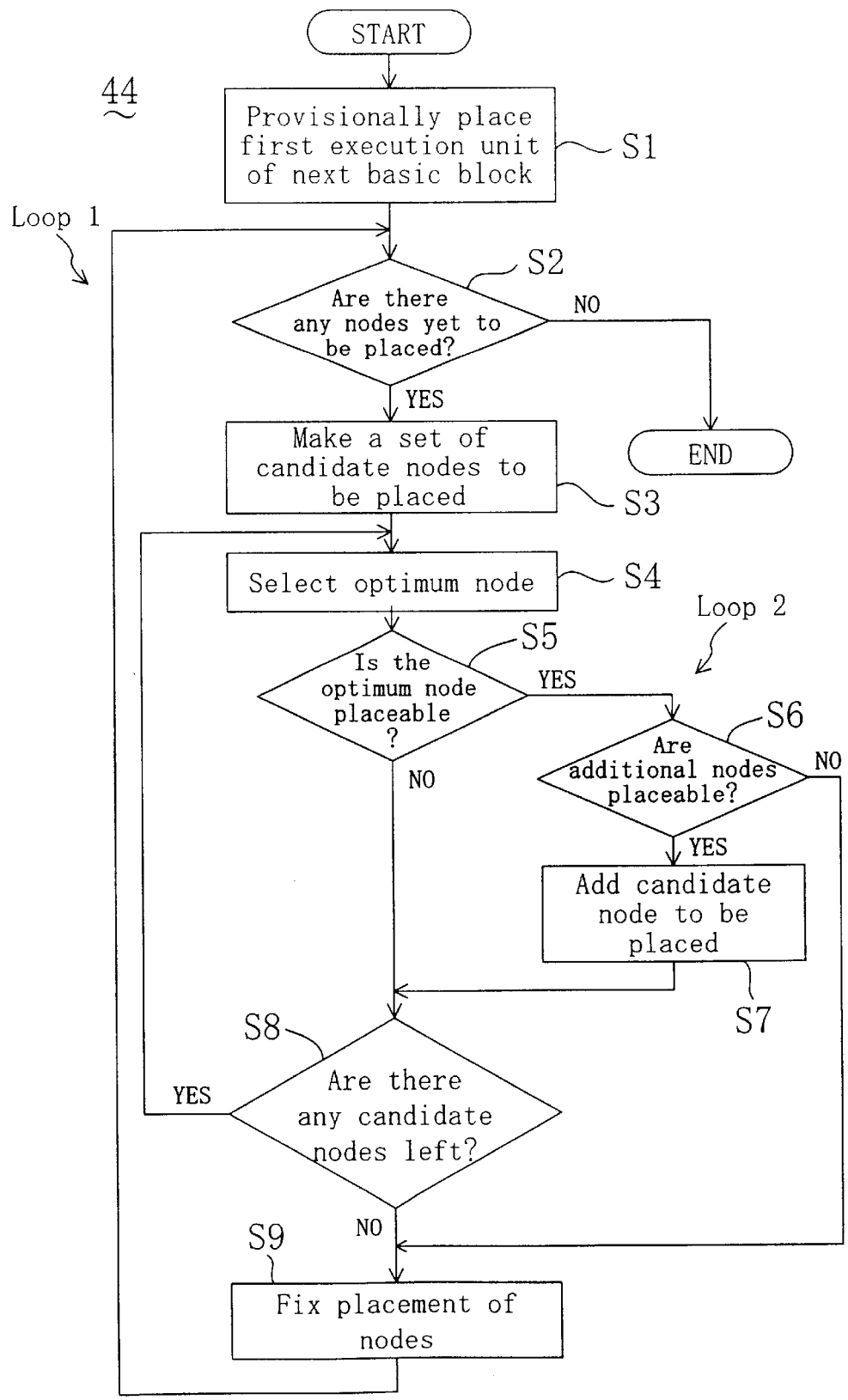
FIG. 13 is a flowchart illustrating a processing procedure in the instruction rearranger included in the program processor shown in FIG. 10.

FIG. 13 is a flowchart illustrating a processing procedure in the instruction rearranger 44. First, in Step S1, the instruction rearranger 44 provisionally places one of the nodes in the dependence graph, which node corresponds to an instruction belonging to the first execution unit of the next basic block. Next, the rearranger 44 repeatedly performs Steps S2 through S9 (Loop 1) until there is no node left yet to be placed in the dependence graph drawn up by the dependence analyzer 43, i.e., until the answer to the query in Step S2 becomes NO.

In Loop 1, first, nodes that can now be regarded as candidates to be placed are extracted in Step S3 from the dependence graph to make a set of candidate nodes to be placed. In this case, each candidate node to be placed requires "all the successors have already been placed" or "only an instruction corresponding to the node placed provisionally in Step S1 is included as successor and dependence thereof on the node placed provisionally is not data dependence". In this specification, a "successor" means an instruction that should be executed after a particular instruction has been executed.

Then, Steps S4 through S8 (Loop 2) are repeatedly performed until there is no candidate node left to be placed for the set of candidate nodes to be placed as made in Step S3, i.e., until the answer to the query in Step S8 becomes NO.

First, in Step S4, a node that seems to be optimum candidate to be placed currently is selected from the set of candidate nodes to be placed. The optimum node is selected heuristically with reference to the dependence graph and the provisionally placed region such that the instructions in the entire basic block can be executed in a shortest possible time. In the illustrated embodiment, such a node as making the total instruction execution time (from the beginning to the end of the dependence graph) longest is supposed to be selected. If there are several instructions meeting this condition, one of the instructions that should be executed last is selected as the optimum node.

Next, in Step S5, it is determined whether or not the optimum node is actually placeable. If the answer is YES, then the node is placed. To execute a plurality of instructions within a single cycle, the instructions to be executed should be decoded (or fetched), arithmetic logical operations should be performed thereon and then the results should be restored into registers or memories. Thus, the determination in Step S5 includes the following conditions:

Can the instruction in question be fetched concurrently with the instruction that has already been placed provisionally?

Are sufficient resources of the target machine (e.g., ALU, multiplier and so on) still available even if another part of the resources, as well as that already used by the instruction placed provisionally, is used by the instruction in question?

Are sufficient ports still available even if other write and read ports of a register file, as well as those already used by the instruction placed provisionally, are used by the instruction in question?

Only when all of these conditions are met, the optimum node can be regarded as placeable. Other constraints might be additionally imposed depending on the type of the target machine.

If the optimum node has been placed provisionally, then the set of nodes that have already been placed provisionally up to now are examined to determine in Step S6 whether or not additional instructions are placeable. The detailed determination process will be described later. If the answer is NO, then Loop 2 is ended.

Alternatively, if it has been determined that additional nodes are placeable, a node that can now be a new candidate node to be placed after the optimum node has been placed is added in Step S7 as another candidate node to be placed. The new candidate node to be placed should have only an instruction corresponding to the optimum node as a successor that has not been placed yet, and the dependence thereof on the instruction corresponding to the optimum node should not be data dependence. That is to say, the new candidate node to be placed should be associated with an instruction that can be executed within the same cycle as the instruction corresponding to the optimum node, but that cannot be executed in a cycle later than that cycle.

After Loop 2 comes to an end, the nodes that have been placed provisionally are regarded as fixed nodes in Step S9. More specifically, instructions, which correspond to the nodes belonging to the set of provisionally placed nodes, are extracted from the original instruction set, and rearranged into a new instruction set to be passed to the execution boundary adder 45.

By performing such a procedure, the nodes included in the dependence graph are placed by beginning with the one to be executed last.

The execution boundary adder 45 adds an execution boundary to each instruction set for which the placement has been fixed in Step S9.

Operating Example

A characteristic operation of the program processor according to the second embodiment shown in FIG. 10 will be described using specific instructions.

Figures 14, 15, 16:
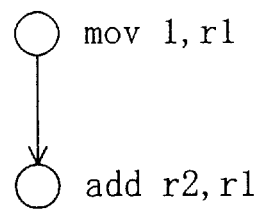
FIG. 14 illustrates exemplary internal form code received by the parallelizer included in the program processor shown in FIG. 10.
FIG. 15 is a dependence graph for the basic block B shown in FIG. 14.
FIG. 16 illustrates execution units obtained by subdividing the basic block B shown in FIG. 14.

FIG. 14 illustrates exemplary internal form code that has been passed from the compiler front end 10 to the parallelizer 40. The internal form code shown in FIG. 14 has been divided by the compiler front end 10 into two basic blocks A and B.

The execution order determiner 41 receives the internal form code shown in FIG. 14 and determines the order of instructions to be passed to the expanded basic block parallelizer 42. In the illustrated embodiment, the basic block is subdivided into execution units in the ascending order by beginning with the end of the program. Thus, the basic blocks B and A are passed in this order to the expanded basic block parallelizer 42.

Subdividing Basic Block B into Execution Units

The dependence analyzer 43 analyzes the instructions belonging to the basic block B, thereby drawing up a dependence graph such as that shown in FIG. 15. In FIG. 15, the solid line arrow represents data dependence, more specifically, an instruction "add r2, r1" depends on another instruction "mov 1, r1".

The instruction rearranger 44 receives the dependence graph shown in FIG. 15 and rearranges the instructions in accordance with the flowchart shown in FIG. 13. When Loop 1 is performed for the first time, only the instruction "add r2, r1" is selected in Step S3 as candidate to be placed, regarded as placeable in Step S5 and then fixed in Step S9. When Loop 1 is performed for the second time, only the instruction "mov 1, r1" is selected in Step S3 as candidate to be placed, regarded as placeable in Step S5 and then fixed in Step S9.

Every time the instruction rearranger 44 performs Loop 1, the execution boundary adder 45 adds an execution boundary to the instruction set. That is to say, each instruction set fixed is grouped as an execution unit. As a result, the execution units in the basic block B are arranged as shown in FIG. 16.

Subdividing Basic Block A into Execution Units

Figure 17:
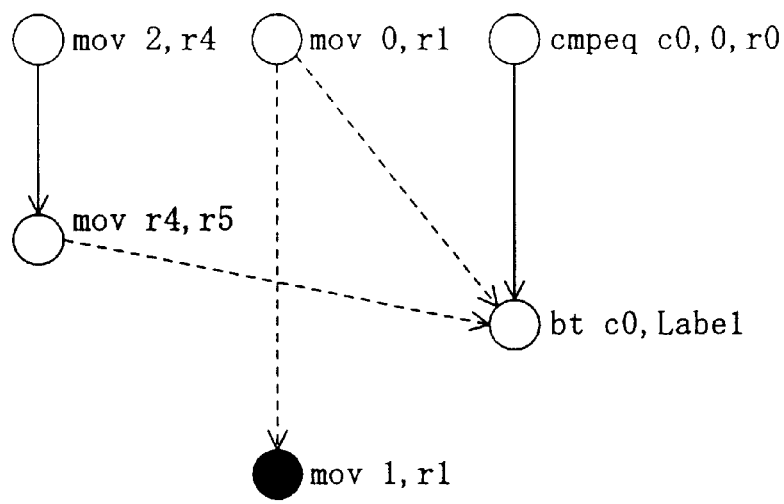
FIG. 17 is a dependence graph for the respective first execution units of the basic blocks A and B shown in FIG. 14.

The dependence analyzer 43 analyzes the instructions belonging to the basic block A, thereby drawing up a dependence graph such as that shown in FIG. 17. In FIG. 17, each solid line arrow represents data dependence, while each broken line arrow represents dependence other than data dependence. Since the basic block B exists just after the basic block A, a dependence graph is drawn up using the instruction "mov 1, r1" belonging to the first execution unit of the basic block B as well. The instruction "mov 1, r1" was already fixed when the basic block B was subdivided into the execution units, and is identified by the solid circle in the dependence graph shown in FIG. 17.

The instruction rearranger 44 receives the dependence graph shown in FIG. 17 and rearranges the instructions in accordance with the flowchart shown in FIG. 13. First, in Step S1, all the instructions belonging to the first execution unit of the next basic block B are placed provisionally. In this example, only the instruction "mov 1, r1" is placed provisionally. Next, since there are nodes yet to be placed (i.e., the answer to the query in Step S2 is YES), Loop 1 should be performed.

When Loop 1 is performed for the first time, a set of candidate nodes to be placed is made of instructions that are placeable within the same execution unit as the instruction "mov 1, r1" (in Step S3). In this case, only the instruction "bt c0, Label", on which no other instructions depend, is placeable within the same execution unit. Thus, the instruction "bt c0, Label" is regarded as placeable in Step S5 and placed provisionally. One more instruction is additionally placeable in the same execution unit. Accordingly, the answer to the query in Step S6 is YES, and a candidate node to be placed is added in Step S7. In this example, the instructions "mov r4, r5" and "mov 0, r1" are placeable within the same execution unit as the instructions "mov 1, r1" and "bt c0, Label", and therefore added as candidate nodes to be placed.

The procedure returns to Step S4 and the instruction "mov r4, r5" is selected as the optimum node, for example. In such a case, the instruction "mov r4, r5" is regarded as placeable in Step S5 and placed provisionally. Since all of the three instructions placeable within the single execution unit are now fixed, no other nodes are additionally placeable (i.e., the answer to the query in Step S6 is NO) and the placement of nodes is fixed in Step S9.

When Loop 1 is performed for the second time, a set of candidate nodes to be placed is made up of the remaining three instructions "mov 2, r4", "mov 0, r1" and "cmpeq c0, 0, r0" in Step S3. As can be seen from FIG. 17, there is no dependence among these instructions. Thus, by repeatedly performing Loop 2 three times, all of these instructions are placed provisionally and then fixed in Step S9.

Figure 18:
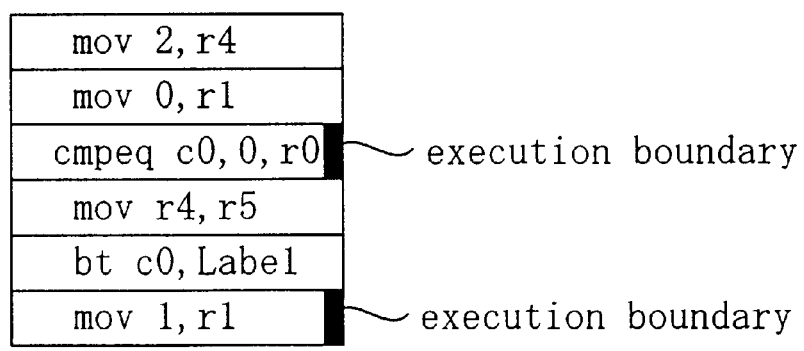
FIG. 18 illustrates execution units obtained by subdividing the respective first execution units of the basic blocks A and B shown in FIG. 14.

Every time the instruction rearranger 44 performs Loop 1, the execution boundary adder 45 adds an execution boundary to the instruction set. That is to say, each instruction set fixed is grouped as an execution unit. As a result, the execution units in the basic block A, including the instruction "mov 1, r1" belonging to the first execution unit of the basic block B, are arranged as shown in FIG. 18.

Figure 19:
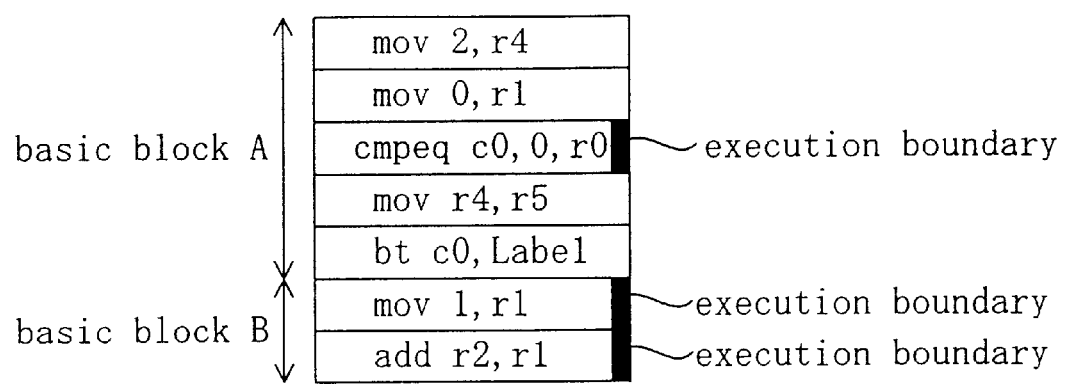
FIG. 19 illustrates, in an assembly language, object code generated for the internal form code shown in FIG. 14.

FIG. 19 illustrates portion of the object code 60 generated by the object code generator 30 from the internal form code shown in FIG. 14. In the prior art, an execution boundary is added to every basic block boundary. In contrast, an execution unit may be composed of instructions ranging across a basic block boundary according to this embodiment. Thus, the internal form code shown in FIG. 14 is performed in three cycles as shown in FIG. 19.

According to this embodiment, a particular basic block, along with an instruction belonging to the first execution unit of the next basic block, is subdivided into execution units, each of which is made up of parallelly executable instructions. Thus, a group of instructions, which belong to two different basic blocks across a basic block boundary, are more likely to be combined into a single execution unit. As a result, the number of cycles taken for the target machine to execute the program can be cut down and the program execution rate increases.

It should be noted that the basic blocks may be subdivided into execution units in the descending order by beginning with the top of the program. In such a case, a basic block located just before a basic block in question may be combinable with the latter basic block. In the foregoing embodiment, instructions are rearranged within the range covering a basic block in question and the first execution unit of the next basic block, and an instruction to be executed last within this range is placed first. Conversely, instructions may be rearranged within a range covering a basic block in question and the last execution unit of the previous basic block, and an instruction to be executed first within this range may be placed first.

Modified Example 1 of Embodiment 2

The execution order determiner 41 may provide a basic block belonging to the innermost loop to the expanded basic block parallelizer 42 preferentially by analyzing the control flow and loops. In such a case, after the basic block belonging to the innermost loop has been processed, a basic block belonging to the next innermost loop is provided. In this manner, the code of the innermost loop, which is executed most frequently, is optimized, thus increasing the program execution rate.

Figure 20A:
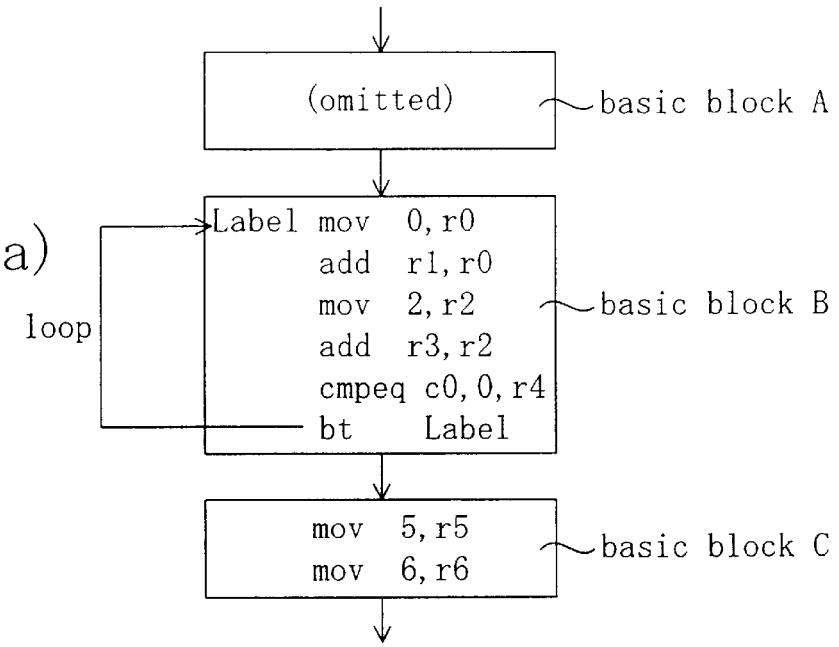
FIG. 20(a) illustrates exemplary internal form code received by the parallelizer included in the program processor shown in FIG. 10.

FIG. 20(a) illustrates exemplary internal form code passed from the compiler front end 10 to the parallelizer 40.

Figure 20B:
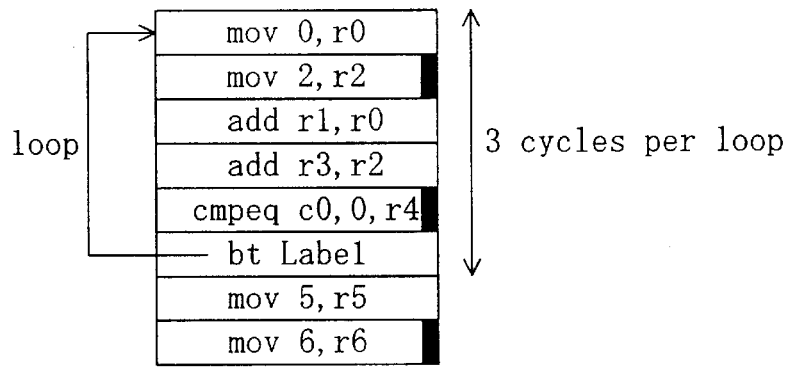
FIG. 20(b) illustrates a result of processing performed on the internal form code shown in FIG. 20(a) according to the second embodiment.
Figure 20C:
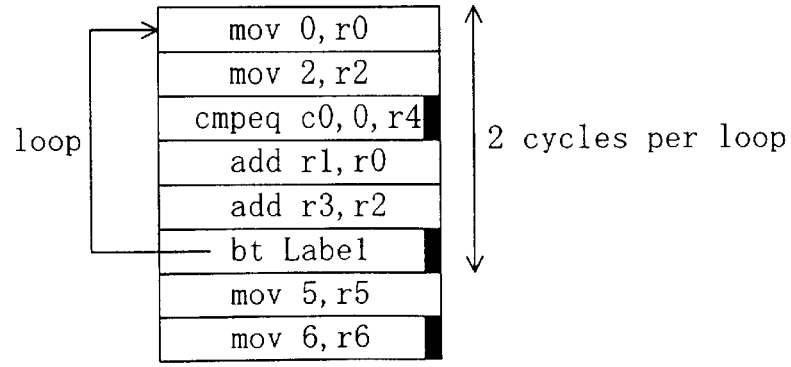
FIG. 20(c) illustrates a result of processing performed on the internal form code shown in FIG. 20(a) according to a modified example of the second embodiment.

This internal form code consists of three basic blocks A, B and C, of which the basic block B is the innermost loop. FIG. 20(b) illustrates a result of processing performed on the internal form code shown in FIG. 20(a) according to the second embodiment. On the other hand, FIG. 20(c) illustrates a result of processing performed on the internal form code shown in FIG. 20(a) according to this modified example. As can be seen from FIGS. 20(b) and 20(c), the number of execution cycles of the innermost loop decreases by one by preferentially optimizing the basic block B as the innermost loop. In general, the innermost loop is expected to be repeatedly executed numerous times. Accordingly, the execution time of the entire program can be shortened according to this modified example.

Modified Example 2 of Embodiment 2

In the foregoing embodiment, the expanded basic block parallelizer 42 subdivides a basic block into execution units, along with the first execution unit of the next basic block. At the same time, the parallelizer 42 may subdivide the basic block into execution units independent of other basic blocks, i.e., without using the first execution unit of the next basic block. And one of these two types of subdivisions, which results in the smaller number of execution units, may be adopted.

FIG. 20(c) illustrates a result obtained by subdividing the internal form code shown in FIG. 20(a) without using the first execution unit of the next basic block. Compare the results shown in FIGS. 20(b) and 20(c), and it can be seen that the number of execution cycles can be reduced if the basic block is processed without using the first execution unit of the next basic block. Thus, according to this modified example, the subdivision result shown in FIG. 20(c) is preferred.

In the foregoing first and second embodiment, inventive program processing is implemented as program processor, but may be implementable as software performing a similar algorithm. Also, the same functions as those performed by the program processor according to the first and second embodiments are attainable by storing a similar program processing program on a computer-readable storage medium such as floppy disk, hard disk, CD-ROM, MO, or DVD and making a computer execute the program.

Also, the object code generated in the first and second embodiments may be executed by the target machine even when the code is stored on a storage medium such as floppy disk, hard disk, CD-ROM, MO, DVD or semiconductor memory.

As is apparent from the foregoing description, if an execution unit located just before or after a basic block boundary is found executable within the same cycle, then the execution unit is combined into a single execution unit according to the present invention. Also, when a particular basic block is subdivided into execution units, an instruction, which belongs to an execution unit closest to the particular basic block and is included in a basic block to be combined with the particular block, is also used. Thus, a group of instructions, which belong to two different basic blocks across a basic block boundary, are more likely to be combined into a single execution unit and be executed in parallel. As a result, the program execution rate of the target machine increases.

What is claimed is:

1. A method for processing a program for parallel processing purposes, the method comprising the steps of:

a) subdividing each of a plurality of basic blocks, into which program code has been divided, into a multiplicity of execution units, each said execution unit being made up of parallelly-executable instructions; and b) combining two of the execution units, which are located just before and after a basic block boundary, into a single execution unit if these execution units are executable within a single clock cycle.

2. The method of claim 1, wherein the step b) comprises analyzing dependence between instructions belonging to the two execution units located just before and after the basic block boundary, and wherein it is determined based on the analyzed dependence between the instructions whether or not these execution units located just before and after the basic block boundary are combinable into the single execution unit.

3. The method of claim 1, wherein in the step a), an execution boundary code indicating the identity as boundary between an associated pair of the execution units is added to each said basic block boundary, and wherein in the step b), if the execution units located just before and after the basic block boundary are executable within the single cycle, the execution boundary code that has been added to the basic block boundary is removed.

4. The method of claim 1, wherein in the step a), includes the steps of:

analyzing dependence among the instructions included in each said basic block; and rearranging the instructions in each said basic block based on the analyzed dependence, and wherein in the rearranging step, instructions, which impose less strict constraints on resources of a target machine for executing the program, are selected preferentially as respective instructions belonging to first and last execution units of each said basic block.

5. The method of claim 4, wherein when the instructions belonging to the first and last execution units of the basic block are selected in the rearranging step, an instruction that is executable only by itself during a clock cycle by the target machine is given a lower priority.

6. The method of claim 1, wherein the step a) includes the steps of:

analyzing dependence among the instructions included in each said basic block; and rearranging the instructions in each said basic block based on the analyzed dependence, and wherein when instructions belonging to first and last execution units of each said basic block are selected in the rearranging step, an instruction with a short word length is given a higher priority.

7. A method for processing a program for parallel processing purposes, the method comprising the step of a) subdividing each of a plurality of basic blocks, into which program code has been divided, into a multiplicity of execution units, each said execution unit being made up of parallelly-executable instructions, wherein in the step a), a particular one of the basic blocks is subdivided into a set of execution units along with an instruction belonging to one of the other execution units that is closest to the particular basic block, the closest execution unit belonging to another set of execution units, into which another one of the basic blocks that is adjacent to, and combinable with, the particular basic block has already been subdivided.

8. The method of claim 7, wherein in the step a), one of the basic blocks that is located just before the particular basic block is used as the combinable basic block, and wherein the particular basic block, along with the instruction belonging to the last execution unit of the combinable basic block, is subdivided into the set of execution units.

9. The method of claim 7, wherein in the step a), one of the basic blocks that is located just after the particular basic block is used as the combinable basic block, and wherein the particular basic block, along with the instruction belonging to the first execution unit of the combinable basic block, is subdivided into the set of execution units.

10. The method of claim 7, wherein in the step a), each said basic block is subdivided into the execution units sequentially in a forward direction from the beginning toward the end of the program.

11. The method of claim 7, wherein in the step a), each said basic block is subdivided into the execution units sequentially in a backward direction from the end toward the beginning of the program.

12. The method of claim 7, wherein in the step a), one of the basic blocks that belongs to the innermost loop is subdivided into the execution units preferentially.

13. The method of claim 7, further comprising the step b) of subdividing each said basic block of the program code into another set of execution units independent of adjacent ones of the basic blocks, wherein results of the steps a) and b) are compared to each other and one of these steps a) and b) that results in the smaller number of execution units is adopted.

14. A system for processing a program for parallel processing purposes, the system comprising:

an intra basic block parallelizer for subdividing each of a plurality of basic blocks, into which program code has been divided, into a multiplicity of execution units, each said execution unit being made up of parallelly-executable instructions; and a basic block boundary parallelizer for combining two of the execution units, which are located just before and after a basic block boundary, into a single execution unit if these execution units are executable within a single clock cycle.

15. A program processor for executing compilation for parallel processing purposes, the processor comprising:

a compiler front end for translating source code into intermediate code by dividing the source code into a plurality of basic blocks;

a parallelizer for converting the intermediate code into code in a parallelly-executable form; and an object code generator for translating the intermediate code in the form converted by the parallelizer into object code executable by a target machine, wherein the parallelizer includes:

an intra basic block parallelizer for subdividing each of a plurality of basic blocks, into which the intermediate code has been divided, into a multiplicity of execution units, each said execution unit being made up of parallelly-executable instructions; and a basic block boundary parallelizer for combining two of the execution units, which are located just before and after a basic block boundary, into a single execution unit if these execution units are executable within a single clock cycle.

16. A system for processing a program for parallel processing purposes, the system comprising:

an expanded basic block parallelizer for subdividing each of a plurality of basic blocks, into which program code has been divided, into a multiplicity of execution units, each said execution unit being made up of parallelly-executable instructions, wherein the expanded basic block parallelizer subdivides a particular one of the basic blocks into a set of execution units along with an instruction belonging to one of the other execution units that is closest to the particular basic block, the closest execution unit belonging to another set of execution units, into which another one of the basic blocks that is adjacent to, and combinable with, the particular basic block has already been subdivided.

17. A program processor for executing compilation for parallel processing purposes, the processor comprising:

a compiler front end for translating source code into intermediate code by dividing the source code into a plurality of basic blocks;

a parallelizer for converting the intermediate code into code in a parallelly-executable form; and an object code generator for translating the intermediate code in the form converted by the parallelizer into object code executable by a target machine, wherein the parallelizer includes an expanded basic block parallelizer for subdividing each of a plurality of basic blocks, into which the intermediate code has been divided, into a multiplicity of execution units, each said execution unit being made up of parallelly-executable instructions, wherein the expanded basic block parallelizer subdivides a particular one of the basic blocks into a set of execution units along with an instruction belonging to one of the other execution units that is closest to the particular basic block, the closest execution unit belonging to another set of execution units, into which another one of the basic blocks that is adjacent to, and combinable with, the particular basic block has already been subdivided.

18. A storage medium having stored thereon a program for a program processing procedure executed by a computer for parallel processing purposes, the program processing procedure comprising the steps of:

(a) subdividing each of a plurality of basic blocks, into which program code has been divided, into a multiplicity of execution units, each said execution unit being made up of parallelly-executable instructions; and (b) combining two of the execution units, which are located just before and after a basic block boundary, into a single execution unit if these execution units are executable within a single clock cycle.

19. A storage medium having stored thereon a program for a program processing procedure executed by a computer through compilation for parallel processing purposes, the program processing procedure comprising the steps of:

(a) translating source code into intermediate code by dividing the source code into a plurality of basic blocks;

(b) subdividing each said basic block of the intermediate code into a multiplicity of execution units, each said execution unit being made up of parallelly-executable instructions;

(c) combining two of the execution units, which are located just before and after a basic block boundary, into a single execution unit if these execution units are executable within a single clock cycle; and (d) translating the intermediate code in the form converted in the steps b) and c) into object code executable by a target machine.

20. A storage medium having stored thereon a program getting a program processing procedure executed by a computer for parallel processing purposes, the program processing comprising the step of subdividing each of a plurality of basic blocks, into which program code has been divided, into a multiplicity of execution units, each said execution unit being made up of parallelly-executable instructions, wherein a particular one of the basic blocks is subdivided into a set of execution units along with an instruction belonging to one of the other execution units that is closest to the particular basic block, the closest execution unit belonging to another set of execution units, into which another one of the basic blocks that is adjacent to, and combinable with, the particular basic block has already been subdivided.

21. A storage medium having stored thereon a program getting a program processing procedure executed by a computer through compilation for parallel processing purposes, the program processing procedure comprising the steps of:

(a) translating source code into intermediate code by dividing the source code into a plurality of basic blocks;

(b) subdividing each said basic block of the intermediate code into a multiplicity of execution units, each said execution unit being made up of parallelly-executable instructions; and (c) translating the intermediate code in the form processed in the step b) into object code executable by a target machine, wherein a particular one of the basic blocks is subdivided into a set of execution units along with an instruction belonging to one of the other execution units that is closest to the particular basic block, the closest execution unit belonging to another set of execution units, into which another one of the basic blocks that is adjacent to, and combinable with, the particular basic block has already been subdivided.

22. A storage medium having stored thereon a set of instructions to be executed in parallel, wherein the instruction set is grouped into a plurality of execution units, each said execution unit being made up of parallelly-executable instructions, and wherein at least one of the execution units is located across a boundary between an associated pair of the basic blocks and is made up of instructions executable within a single clock cycle.

23. A storage medium having stored thereon a set of instructions parallelized by a program processor, wherein the instruction set is grouped into a plurality of execution units, each said execution unit being made up of instructions executed within a single clock cycle, and wherein at least one of the execution units includes a last instruction of a first basic block and another instruction of a second basic block different from the first basic block.

24. A processor for executing an instruction set stored in a storage medium, said storage medium having stored thereon a set of instructions parallelized by a program processor, wherein the instruction set is grouped into a plurality of execution units, each said execution unit being made up of instructions executed within a single clock cycle, and wherein at least one of the execution units includes a last instruction of a first basic block and another instruction of a second basic block different from the first basic block.

25. The processor of claim 24, wherein a number of units in which instructions are executed in parallel is variable.

26. The processor of claim 25, wherein an execution boundary code indicating a boundary between the execution units is added to the instruction set by the program processor.

27. The processor of claim 26, wherein said processor implements a variable-length instruction system.

28. A method of processing a program for parallel processing purposed, the method comprising the step of:

(a) dividing the program into a plurality of basic blocks, each of the plurality of basic blocks is an instruction set without any branch or interrupt in the middle thereof;

(b) subdividing each of the plurality of basic blocks divided by step (a) into a multiplicity of execution units, each of the multiplicity of execution units being made up of parallelly-executable instructions;

(c) determining whether two of the execution units, which are located just before and after a basic block boundary, are executable within a single clock cycle or not after step (b); and (d) combining the two of execution units into one single execution unit if the result of step (c) indicates that the two of the execution units are executable within a single clock cycle.

* * * * *

UNITED STATES PATENT AND TRADEMARK OFFICE
CERTIFICATE OF CORRECTION

PATENT NO. : 6,760,906 B1
DATED : July 6, 2004
INVENTOR(S) : Kensuke Odani et al.

It is certified that error appears in the above-identified patent and that said Letters Patent is hereby corrected as shown below:

<u>Title page,</u>
Item [75], Inventors, change the city of residence for the first inventor from "Osaka" to
-- Kyoto --.

Signed and Sealed this

Second Day of November, 2004

JON W. DUDAS
*Director of the United States Patent and Trademark Office*